(12) United States Patent
Shamsaifar et al.

(10) Patent No.: US 7,843,387 B2
(45) Date of Patent: Nov. 30, 2010

(54) WIRELESS LOCAL AREA NETWORK ANTENNA SYSTEM AND METHOD OF USE THEREFORE

(75) Inventors: Khosro Shamsaifar, Ellicott City, MD (US); Cornelius DuToit, Ellicott City, MD (US); Louise C. Sengupta, Ellicott City, MD (US); Donya He, Potomac Falls, VA (US)

(73) Assignee: Paratek Microwave, Inc., Nashua, NH (US)

( * ) Notice: Subject to any disclaimer, the term of this patent is extended or adjusted under 35 U.S.C. 154(b) by 0 days.

(21) Appl. No.: 12/284,516

(22) Filed: Sep. 23, 2008

(65) Prior Publication Data

US 2009/0046007 A1 Feb. 19, 2009

Related U.S. Application Data

(62) Division of application No. 10/850,991, filed on May 22, 2004, now abandoned.

(60) Provisional application No. 60/472,599, filed on May 22, 2003.

(51) Int. Cl.
*H01Q 3/00* (2006.01)
(52) U.S. Cl. ..................... 342/373; 342/372
(58) Field of Classification Search ............... 342/154, 342/354, 371, 372, 373
See application file for complete search history.

(56) References Cited

U.S. PATENT DOCUMENTS

| | | | |
|---|---|---|---|
| 5,312,790 A | 5/1994 | Sengupta et al. | 501/137 |
| 5,414,433 A * | 5/1995 | Chang | 342/375 |
| 5,427,988 A | 6/1995 | Sengupta et al. | 501/137 |
| 5,486,491 A | 1/1996 | Sengupta et al. | 501/137 |
| 5,593,495 A | 1/1997 | Masuda et al. | 117/4 |
| 5,635,433 A | 6/1997 | Sengupta | 501/137 |
| 5,635,434 A | 6/1997 | Sengupta | 501/138 |
| 5,640,042 A | 6/1997 | Koscica et al. | 257/595 |
| 5,693,429 A | 12/1997 | Sengupat et al. | 428/699 |
| 5,694,134 A | 12/1997 | Barnes | 343/700 |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,870,063 A * | 2/1999 | Cherrette et al. | 343/853 |
| 5,886,867 A | 3/1999 | Chivukula et al. | 361/311 |
| 5,990,766 A | 11/1999 | Zhang et al. | 333/205 |
| 6,013,032 A | 1/2000 | Savord | 600/443 |
| 6,074,971 A | 6/2000 | Chiu et al. | 501/139 |
| 6,377,142 B1 | 4/2002 | Chiu et al. | 333/238 |
| 6,377,217 B1 | 4/2002 | Zhu et al. | 343/700 |
| 6,377,440 B1 | 4/2002 | Zhu et al. | 361/311 |
| 6,404,614 B1 | 6/2002 | Zhu et al. | 361/277 |
| 6,492,883 B2 | 12/2002 | Liang et al. | 333/132 |
| 6,514,895 B1 | 2/2003 | Chiu et al. | 501/137 |
| 6,525,630 B1 | 2/2003 | Zhu et al. | 333/205 |

(Continued)

OTHER PUBLICATIONS

PCT International Search Report for International Application No. PCT/US2004/16205 dated May 22, 2004.

*Primary Examiner*—Dao L Phan
(74) *Attorney, Agent, or Firm*—Andrew Gust; Guntin Meles & Gust, PLC

(57) ABSTRACT

An embodiment of the present invention provides an apparatus, comprising a plurality of sub-arrays and at least one beamformer driving the plurality of sub-arrays, the at least one beamformer employing at least one phase shifter.

20 Claims, 3 Drawing Sheets

U.S. PATENT DOCUMENTS

| | | | |
|---|---|---|---|
| 6,531,936 B1 | 3/2003 | Chiu et al. | 333/164 |
| 6,535,076 B2 | 3/2003 | Partridge et al. | 333/17.1 |
| 6,538,603 B1 | 3/2003 | Chen et al. | 342/372 |
| 6,556,102 B1 | 4/2003 | Sengupta et al. | 333/161 |
| 6,584,144 B2 * | 6/2003 | Alamouti et al. | 375/147 |
| 6,590,468 B2 | 7/2003 | du Toit et al. | 333/17.3 |
| 6,597,265 B2 | 7/2003 | Liang et al. | 333/204 |
| 6,653,985 B2 * | 11/2003 | Sikina et al. | 343/853 |
| 2003/0062541 A1 | 4/2003 | Warner | |
| 2005/0110674 A1 | 5/2005 | Mendolia et al. | |

* cited by examiner

WIRELESS LOCAL AREA NETWORK ANTENNA SYSTEM AND METHOD OF USE THEREFORE

CROSS-REFERENCE TO RELATED APPLICATION

This application is a divisional of U.S. patent application Ser. No. 10/850,991, file May 22, 2004 now abandoned entitled, WIRELESS LOCAL AREA NETWORK ANTENNA SYSTEM AND METHOD OF USE THEREFORE", to Shamsaifar et al. which claimed the benefit of priority under 35 U.S.C Section 119 from U.S. Provisional Application Ser. No. 60/472,599, filed May 22, 2003, entitled, "Wireless Local Area Network Antenna System", by Shamsaifar et al., assigned to Paratek Microwave, Inc.

BACKGROUND OF THE INVENTION

The present invention generally relates to electronically beam steering phased array antennas, tunable phase shifter, and tunable dielectric capacitors.

Multipath delay causes the information symbols represented in an 802.11 signal to overlap, which confuses the receiver. This is often referred to as intersymbol Interference (ISI). Because the shape of the signal conveys the information being transmitted, the receiver will make mistakes when demodulating the signal's information. If the delays are great enough, bit errors in the packet will occur. The receiver won't be able to distinguish the symbols and interpret the corresponding bits correctly.

When multipath strikes in this way, the receiving station will detect the errors through 802.11's error checking process. The CRC (cyclic redundancy check) checksum will not compute correctly, indicating that there are errors in the packet. In response to bit errors, the receiving station will not send an ACK to the source. The source will then eventually retransmit the signal after regaining access to the medium.

Because of retransmissions, users will encounter lower throughput when multipath is significant. The reduction in throughput depends on the environment. As examples, 802.11 signals in homes and offices may encounter 50 nanoseconds multipath delay while a manufacturing plant could be as high as 300 nanoseconds.

Thus, there is a strong need in the RF industry and more particularly in the wireless local area network industry for wireless devices, networks, methods and systems which may overcome multipath and other RF transmission shortcomings to improve performance in a wireless local area network.

SUMMARY OF THE INVENTION

The present invention provides an apparatus, comprising an active receive aperture and a multiple scanning beamformer receiving signals from said active receive aperture via at least one low noise amplifier (LNA) stage and at least one beamformer, the at least one beamformer may employ at least one phase shifter. The phase shifters may comprise a voltage tunable dielectric material and the voltage tunable dielectric material may be Parascan® dielectric material.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
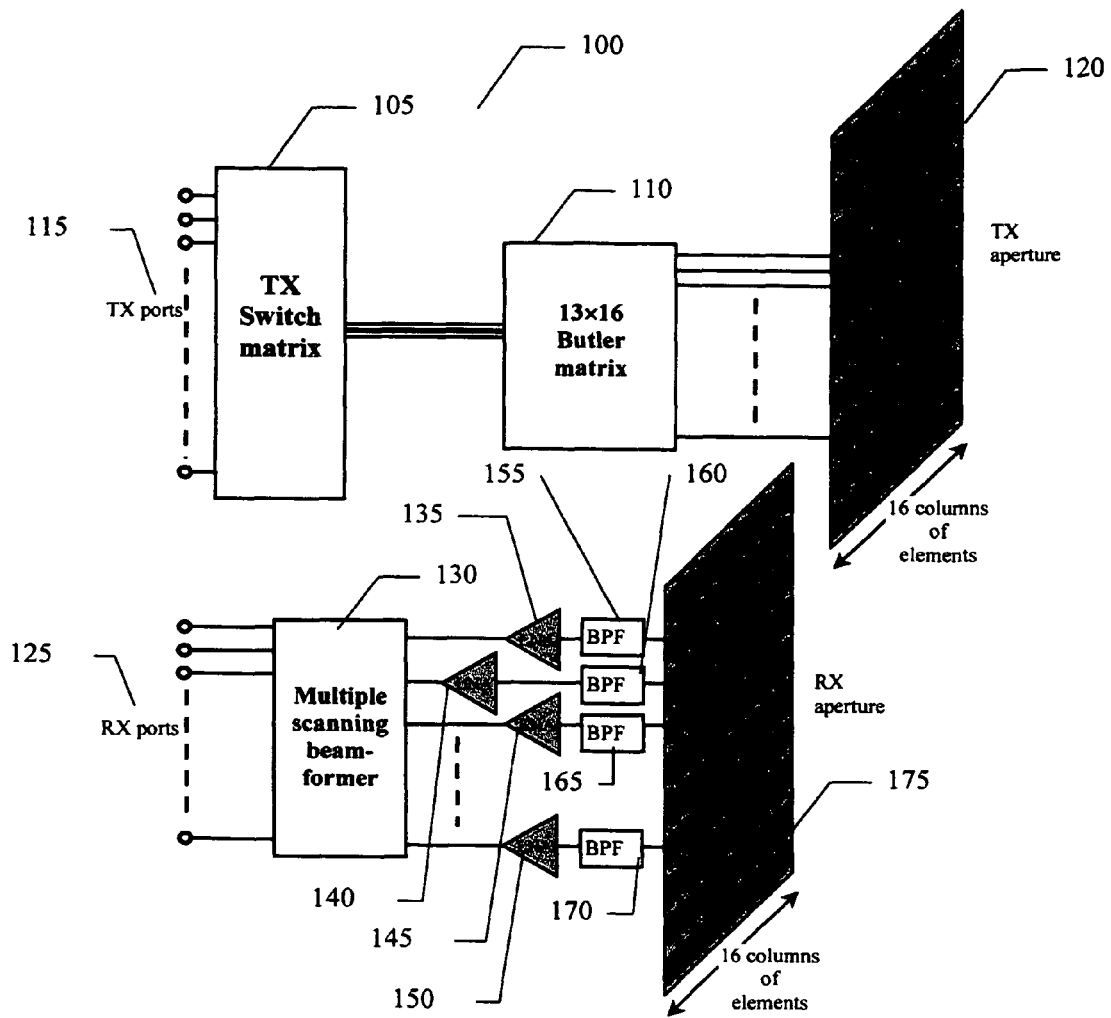
FIG. 1 is an illustration of one embodiment of the antenna system of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DESCRIPTION OF THE PREFERRED EMBODIMENT

Although tunable materials in general can be utilized and are anticipated by the present invention, one tunable material that is described in an embodiment of the present invention is Parascan®. Parascan® is a trademarked tunable dielectric material developed by Paratek Microwave, Inc., the assignee of the present invention. Tunable dielectric materials are the materials whose permittivity (more commonly called dielectric constant) can be varied by varying the strength of an electric field to which the materials are subjected or immersed. Examples of such materials can be found in U.S. Pat. Nos. 5,312,790, 5,427,988, 5,486,491, 5,693,429 and 6,514,895. These materials show low dielectric loss and high tunability. Tunability is defined as the fractional change in the dielectric constant with applied voltage. The patents above are incorporated into the present application by reference in their entirety. Parascan® voltage tunable dielectric materials are embodied within software controlled tunable filters, diplexers, matching networks and phased-array antennas, tunable notch filters, null-steer antennas, smart antennas, tunable phase shifters, voltage controlled oscillators (VCO's) and voltage tunable dielectric capacitors. The terms Parascan® voltage tunable capacitors, Parascan® variable capacitors, Parascan® tunable dielectric capacitors and Parascan® varactors have the same meaning and are interchangeable herein. The exemplary embodiments can include an electronically tunable dielectric material comprising; at least one electronically tunable dielectric phase comprising barium strontium titanate; and at least one metal silicate phase comprising a silicate of at least one metal selected from Be, Mg, Ca, Sr, Ba, Ra, Li, Na, K, Rb, Cs, Al, Zr, Zn, Fr, B, Fe, Mn, Cu, Ce, Cr, La, Y, Ti, Ta, Nb, Mo, W, Ni, Pd, Pb and Bi, wherein the metal silicate comprise from about 5 to about 65 weight percent of material.

Existing antenna configurations for wireless networks may utilize an antenna configuration that is based on multiple fixed beams. For example, there may be 13 independent beams that support three simultaneous packets on three different channels. The 10 other unused beams when not in "listening" or "scanning" mode may be used solely to detect new user access requests. Since the beams are narrow, multipath problems may be reduced to some extent, but since the sidelobes or the slope of the main beam can still detect multipath signals, it is not eliminated completely. If the number of beams is reduced, for example, and not by way of limitation, from 13 to 4, the multipath negative effects may be reduced. However, with a reduced number of beams, the number of users that can be covered efficiently may also be reduced. Another concern for the existing system is that the 3.8 dB crossover or scalloping loss typical in multiple adjacent fixed beams may cause capacity and throughput reduction. Yet another concern for the existing systems is that if the users decide to move around inside the coverage range, they will face even more degraded quality of service.

The present invention provides an improved wireless local area network by improving antenna system throughput. This may be accomplished by mitigating multipath; improving signal to interference ratio; and reducing the system hardware cost by eliminating unused beams. Furthermore, by using scanning beams, the present invention may provide mobility and may track mobile users and may even provide location-based services. This improved wireless local area network antenna system may use electronically scanning wireless local area network (WLAN) phased array antennas that may use tunable phase shifters which may incorporate a tunable material. Further, this tunable material in an embodiment of the present invention may use Parascan® tunable material. Although the present invention is not limited in this respect.

Turning now to the figures, FIG. 1 illustrates an antenna system, shown generally as 100, with a passive aperture 120 driven by a Butler Matrix beamformer 110 which may be used for transmit only. A transmit switch matrix 105 with transmit ports 115 may provide the input to Butler matrix 110.

An active receive aperture 175 may be used in the present invention and in one embodiment may be capable of handling 4 or more independently steerable beams. In one embodiment, the receive aperture may have 16 columns of elements to provide this functionality. Although, the present invention is not limited to any particular number of rows or columns. Also, it is understood that the number of steerable beams and whether or not they are independently steerable or not is merely illustrative of one embodiment and it is understood that a large number of steerable beams are within the scope of the present invention.

The active beamformer 130 for receiving may include low noise amplifiers (LNA) stages 135, 140, 145 and 150, and beamformers 155, 160, 165 and 170 which in one embodiment of the present invention may employ phase shifters. One type of phase shifter that may be utilized in the present invention, although it is understood that the present invention is not limited in this respect, are phase shifters based on Parascan® tunable materials. Receiving output from the LNAs is a multiple scanning beam former 130 with receive ports 125.

In one embodiment of the present invention, one beam may be dedicated to finding new users and user requests, and to monitor interference. Although it is understood that one beam or more than one beam can accomplish this in alternate embodiments of the present invention. Once the scanning beam has identified the users (in one embodiment as described herein, the users may be up to three simultaneous packets on three difference channels), the other 3 or more beams may be directed to point to each of the users at the maximum gain. Thus, the system of the present invention covers essentially the same number of users with fewer independent beams than the current state of the art systems. In this embodiment, 4 scanning beams may replace 13 fixed beams. This may reduce the size and complexity of the antenna hardware and produce better performance by reducing multipath effects. Since most of the WLAN users are fixed users, the present invention allows for a methodology to profile the interference environment. The methodology could also be self-learning and adaptive by adding a feedback loop, thereby improving the interference reduction over time and adapting to changes in the interference profile. The use of continuously steerable beams also enables the tracking of mobile users.

Further, phase shifters can also be added in the transmit path which could provide additional system improvement.

Figure 2:
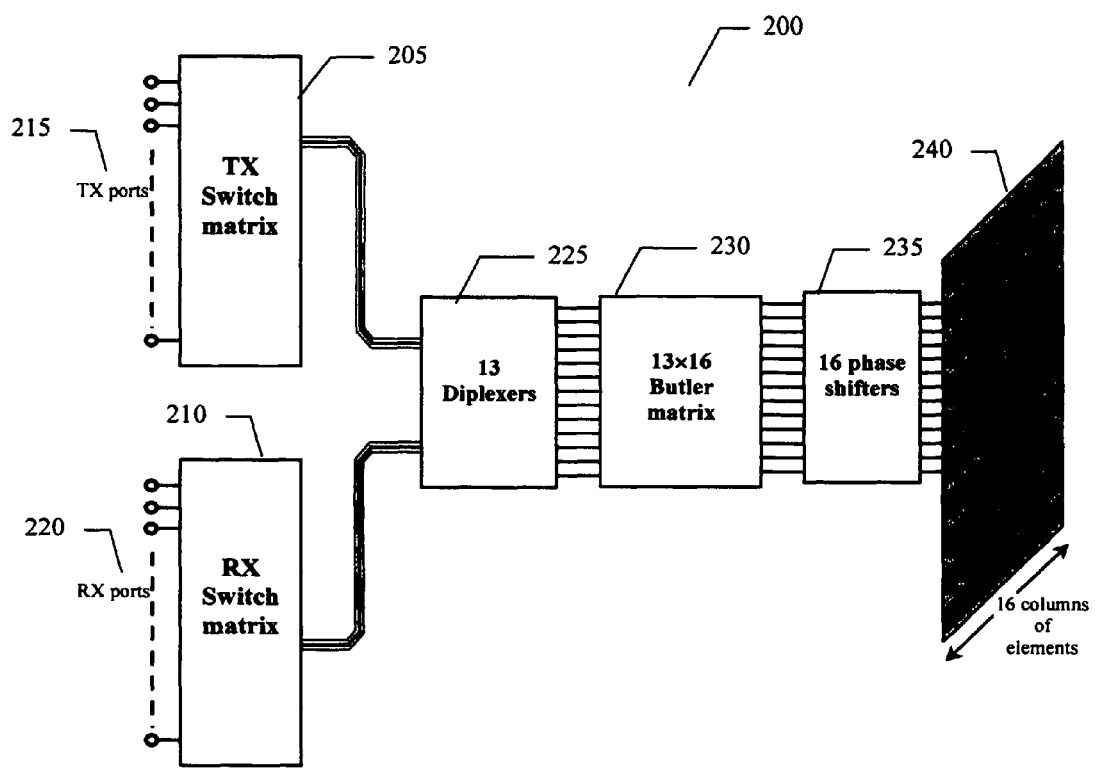
FIG. 2 is an illustration of another embodiment of the antenna system of the present invention.

Another problem with the current state of the art approaches, which may consist of several adjacent fixed beams, is the existence of crossover or scalloping loss of typically 3.8 dB. As depicted in FIG. 2, shown generally as 200, the present invention overcomes this shortcoming by adding phase shifters 235 between the Butler matrix 230 and the radiating columns 240. In this way, the present invention provides for the potential to control the phase shifters and thereby enable the ability change the directions of the beams pointed to the users by up to half the beam spacing and to reduce the crossover loss down to 0.5 dB from 3.8 dB. As the phase shifters may have an additional loss of about 0.5 dB, the benefit may be up to 2.8 dB. Since more phase shift may be needed at the edges of the array, the associated more loss towards the edges of the array may also improve the sidelobe levels to some extent, which will further improve the multipath problem. Transmit switch matrix 205 with transmit ports 215 as well as receive switch 210 with receive ports 220 feed into diplexers 225 (in one embodiment 13 diplexers are used). Diplexers 225 provide input to and receive output from butler matrix 230.

The present invention also advances the state of the art by improving the signal to interference ratio as well. This may be achieved by null the steering capability of the multi beam steerable antenna of the present invention. Since all of the beams may be steered simultaneously, the signal to interference ratio and the cross-over loss may be improved by optimizing the beamsteering such that the interferers will be as close as possible to pattern nulls, and the users as close as possible to pattern maxima.

Figure 3:
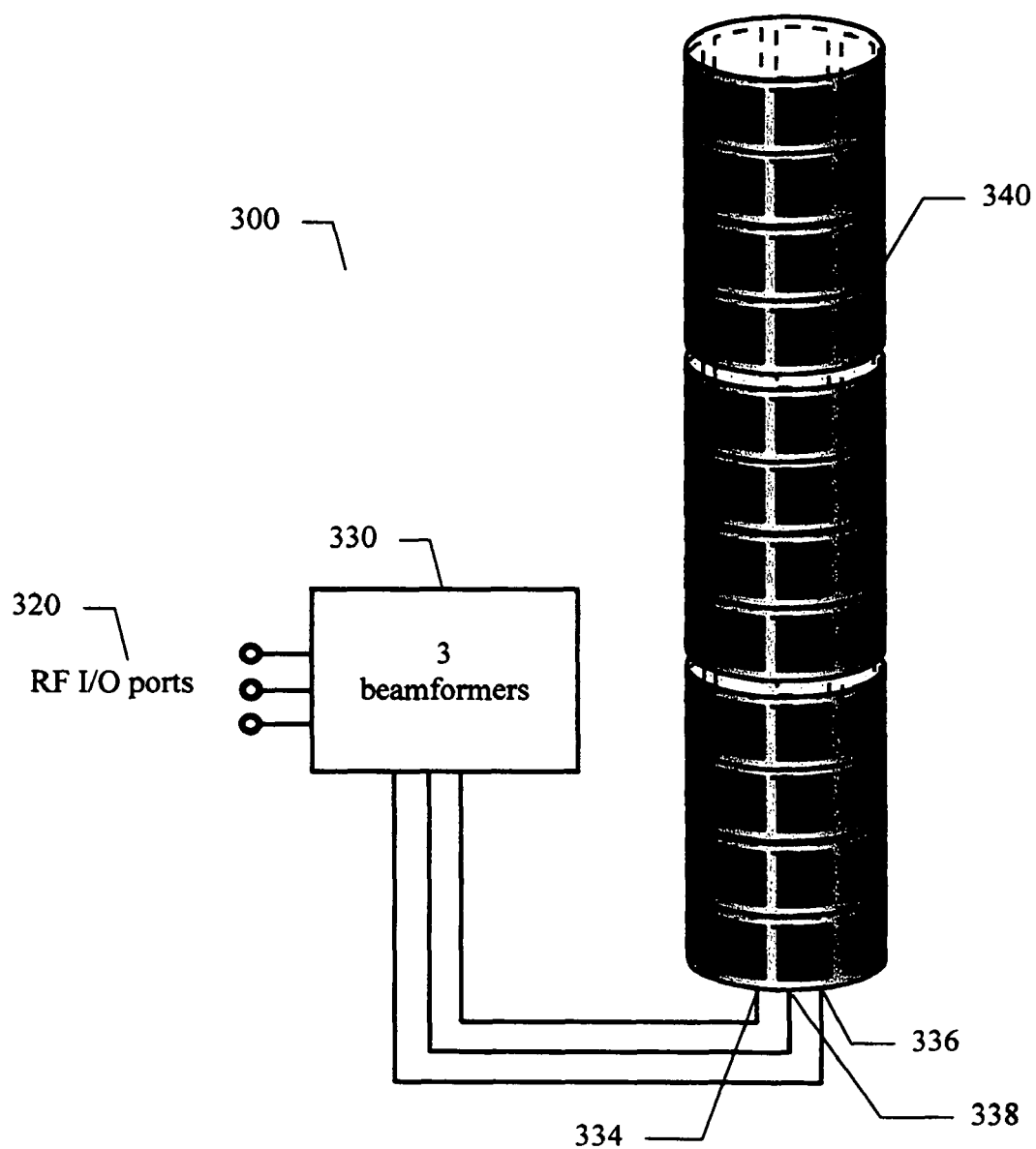
FIG. 3 is an illustration of yet another embodiment of the antenna system of the present invention.

Turning now to FIG. 3, another embodiment of the present invention is shown generally at 300. This embodiment may be particularly useful, although not limited in this respect, to situations where only moderate antenna gain is needed; and thus enables an eloquent system capable of handling up to 3 simultaneous beams. Three cylindrical sub-arrays 334, 336 and 338, each producing a 22.5 deg beamwidth in elevation and 45 deg in azimuth can be stacked up to create a single cylindrical form factor of not more than about 18 inches high and 2.8 inches in diameter. It is understood that the beamwidth, elevation, azimuth and stack size and number articulated herein, and any number form factors with varying height and width, are merely one embodiment of the present invention and a wide array of elevations, azimuths and stack sizes as well as any number of cylinder form factors with varying heights and widths are intended to be within the scope of the present invention.

Each sub-array 334, 336 and 338 in one embodiment is capable of scanning a 45 deg wide beam in azimuth through 360 degrees. Although the present invention is not limited in this respect. In one embodiment of the present invention, a 12 dBi gain antenna system may be provided. Beamformers (3 in one preferred embodiment of the present invention) 330 with RF I/O ports (3 in one preferred embodiment of the present invention) drive sub-array 334, 336 and 338.

While the present invention has been described in terms of what are at present believed to be its preferred embodiments, those skilled in the art will recognize that various modifications to the disclose embodiments can be made without departing from the scope of the invention as defined by the following claims.

What is claimed is:

1. An apparatus, comprising:
a plurality of cylindrical sub-arrays stacked on each other to form a single cylinder that produces a 45 degree beamwidth in azimuth; and
at least one beamformer driving said plurality of sub-arrays, said at least one beamformer employing at least one phase shifter, wherein the phase shifter comprises a voltage tunable dielectric material, wherein the dielectric material comprises barium strontium titanate and at least one metal silicate phase having a silicate that is from 5 to 65 weight percent of material.

2. The apparatus of claim 1, wherein the metal silicate comprises at least one metal selected from Be, Mg, Ca, Sr, Ba, Ra, Li, Na, K, Rb, Cs, Al, Zr, Zn, Fr, B, Fe, Mn, Cu, Ce, Cr, La, Y, Ti, Ta, Nb, Mo, W, Ni, Pd, Pb and Bi.

3. The apparatus of claim 1, wherein the plurality of sub-arrays are three.

4. The apparatus of claim 1, wherein the single cylinder has a height of less than 18 inches and a diameter of less than 2.8 inches.

5. The apparatus of claim 1, wherein the single cylinder produces a 22.5 degree beamwidth in elevation.

6. An apparatus, comprising:
a plurality of cylindrical sub-arrays stacked on each other to form a single cylinder; and
at least one beamformer driving said plurality of sub-arrays, said at least one beamformer employing at least one phase shifter, wherein the phase shifter comprises a voltage tunable dielectric material, wherein the dielectric material comprises barium strontium titanate and at least one metal silicate phase comprising at least one metal selected from Be, Mg, Ca, Sr, Ba, Ra, Li, Na, K, Rb, Cs, Al, Zr, Zn, Fr, B, Fe, Mn, Cu, Ce, Cr, La, Y, Ti, Ta, Nb, Mo, W, Ni, Pd, Pb and Bi.

7. The apparatus of claim 6, wherein the silicate is from 5 to 65 weight percent of material.

8. An apparatus comprising:
a plurality of cylindrical sub-arrays stacked on each other to form a single cylinder; and
at least one beamformer driving said plurality of sub-arrays, said at least one beamformer employing at least one phase shifter, wherein the phase shifter comprises a voltage tunable dielectric material, wherein the dielectric material comprises barium strontium titanate and at least one metal silicate phase comprising at least one metal selected from Be, Mg, Ca, Sr, Ba, Ra, Li, Na, K, Rb, Cs, Al, Zr, Zn, Fr, B, Fe, Mn, Cu, Ce, Cr, La, Y, Ti, Ta, Nb, Mo, W, Ni, Pd, Pb and Bi, wherein the single cylinder produces a 22.5 degree beamwidth in elevation.

9. The apparatus of claim 6, wherein the single cylinder produces a 45 degree beamwidth in azimuth.

10. The apparatus of claim 6, wherein the plurality of subarrays are three.

11. The apparatus of claim 6, wherein the single cylinder has a height of less than 18 inches and a diameter of less than 2.8 inches.

12. The apparatus of claim 10, wherein the single cylinder produces a 45 degree beamwidth in azimuth.

13. The apparatus of claim 11, wherein the single cylinder produces a 45 degree beamwidth in azimuth.

14. The apparatus of claim 8, wherein the silicate is from 5 to 65 weight percent of material.

15. The apparatus of claim 14, wherein the single cylinder produces a 45 degree beamwidth in azimuth.

16. The apparatus of claim 8, wherein the single cylinder produces a 45 degree beamwidth in azimuth.

17. The apparatus of claim 8, wherein the plurality of subarrays are three.

18. The apparatus of claim 17, wherein the single cylinder produces a 45 degree beamwidth in azimuth.

19. The apparatus of claim 8, wherein the single cylinder has a height of less than 18 inches and a diameter of less than 2.8 inches.

20. The apparatus of claim 19, wherein the single cylinder produces a 45 degree beamwidth in azimuth.

* * * * *